(12) United States Patent
Ozturk et al.

(10) Patent No.: US 8,664,432 B2
(45) Date of Patent: *Mar. 4, 2014

(54) USE OF S-(3-AMINOPROPYL)THIOSULFURIC ACID OR METAL SALT THEREOF

(75) Inventors: Orhan Ozturk, Toyonaka (JP); Yasuo Uekita, Nishinomiya (JP); Kenichi Takeuchi, Toyonaka (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 13 days.

This patent is subject to a terminal disclaimer.

(21) Appl. No.: 13/375,859

(22) PCT Filed: Jun. 1, 2010

(86) PCT No.: PCT/JP2010/059588
§ 371 (c)(1),
(2), (4) Date: Dec. 2, 2011

(87) PCT Pub. No.: WO2010/140704
PCT Pub. Date: Dec. 9, 2010

(65) Prior Publication Data
US 2012/0088928 A1    Apr. 12, 2012

(30) Foreign Application Priority Data

| Jun. 4, 2009 | (JP) | 2009-134837 |
| Jul. 27, 2009 | (JP) | 2009-174090 |
| Sep. 15, 2009 | (JP) | 2009-212920 |
| Oct. 29, 2009 | (JP) | 2009-248797 |
| Dec. 18, 2009 | (JP) | 2009-287737 |
| Mar. 5, 2010 | (JP) | 2010-048794 |

(51) Int. Cl.
*C07C 309/00* (2006.01)

(52) U.S. Cl.
USPC .......................................................... 562/36

(58) Field of Classification Search
None
See application file for complete search history.

(56) References Cited

U.S. PATENT DOCUMENTS

| 4,417,012 A | 11/1983 | Moniotte |
| 4,520,154 A | 5/1985 | Moniotte |
| 4,532,080 A | 7/1985 | Delseth et al. |
| 4,581,297 A * | 4/1986 | Delseth et al. ................ 428/462 |
| 4,587,296 A | 5/1986 | Moniotte |
| 4,704,334 A | 11/1987 | Delseth et al. |
| 5,106,913 A | 4/1992 | Yamaguchi et al. |
| 2005/0031651 A1 | 2/2005 | Gervais et al. |

FOREIGN PATENT DOCUMENTS

| JP | 58-17132 A | 2/1983 |
| JP | 59-91140 A | 5/1984 |
| JP | 61-236707 A | 10/1986 |
| JP | 02-268153 A | 11/1990 |
| JP | 03-115259 A | 5/1991 |
| JP | 2006-525226 A | 11/2006 |
| JP | 2009-134837 A | 6/2009 |
| JP | 2009-174090 A | 8/2009 |
| JP | 2009-212920 A | 9/2009 |
| JP | 2009-248797 A | 10/2009 |
| JP | 2009-287737 A | 12/2009 |
| JP | 2010-048794 A | 3/2010 |

OTHER PUBLICATIONS

Database CAPLUS Chemical Abstracts Service, Columbus, Ohio, US; Database Accession No. 1969:421632, Abstract of Klayman et al., Journal of Medicinal Chemistry (1969), 12, 510-12.*
Translation of the International Preliminary Report on Patentability mailed Jan. 26, 2012, in International Application No. PCT/JP2010/059588.
International Search Report dated Jun. 29, 2010, cited in PCT/JP2010/059588.

* cited by examiner

*Primary Examiner* — Karl J Puttlitz
(74) *Attorney, Agent, or Firm* — Sughrue Mion, PLLC

(57) ABSTRACT

Use of S-(3-aminopropyl)thiosulfuric acid and/or a metal salt thereof for improving the viscoelastic properties of a vulcanized rubber.

10 Claims, No Drawings

USE OF S-(3-AMINOPROPYL)THIOSULFURIC ACID OR METAL SALT THEREOF

CROSS REFERENCE TO RELATED APPLICATIONS

This application is a National Stage of International Application No. PCT/JP2010/059588 filed Jun. 1, 2010, claiming priority based on Japanese Patent Application Nos. 2009-134837 filed Jun. 4, 2009, 2009-174090 filed Jul. 27, 2009, 2009-212920 filed Sep. 15, 2009, 2009-248797 filed Oct. 29, 2009, 2009-287737 filed Dec. 18, 2009 and 2010-048794 filed Mar. 5, 2010, the contents of all of which are incorporated herein by reference in their entirety.

FIELD OF THE INVENTION

The present invention relates to a use of S-(3-aminopropyl)thiosulfuric acid or a metal salt thereof.

BACKGROUND ARTS

Recently, from the viewpoint of the requirement of the environmental protection, an improvement of fuel consumption of cars, that is, low fuel consumption, has been demanded, and it has been known that fuel consumption of cars is improved by improvement of the viscoelastic properties in the field of tires of cars (see, "Introduction Book of Rubber Technology", edited by Society of Rubber Industry, Japan, published by Maruzen Co., Ltd., 124 page).

DISCLOSURE OF THE INVENTION

The present invention provides:
<1> Use of S-(3-aminopropyl)thiosulfuric acid and/or a metal salt thereof for improving the viscoelastic properties of a vulcanized rubber;
<2> The use according to <1>, wherein the metal ion of the metal salt of S-(3-aminopropyl)thiosulfuric acid is lithium ion, sodium ion, potassium ion, cesium ion, cobalt ion, copper ion or zinc ion;
<3> The use according to <1>, wherein the metal ion of the metal salt of 5-(3-aminopropyl)thiosulfuric acid is lithium ion, sodium ion or potassium ion;
<4> The use according to <1>, wherein the metal salt of S-(3-aminopropyl)thiosulfuric acid is a 3-aminopropylthiosulfate represented by the formula (2)

$$(H_2N-(CH_2)_3-SSO_3^-)_n \cdot M^{n+} \quad (2)$$

wherein $M^{n+}$ represents a metal ion and n represents a valence thereof;
<5> The use according to <4>, wherein the metal ion is lithium ion, sodium ion, potassium ion, cesium ion, cobalt ion, copper ion or zinc ion;
<6> The use according to <4>, wherein the metal ion is lithium ion, sodium ion or potassium ion.

BEST MODES FOR CARRYING OUT THE INVENTION

In the present invention, "improving the viscoelastic properties" means "improving loss coefficient (tan δ) of a vulcanized rubber".

S-(3-aminopropyl)thiosulfuric acid used in the present invention is a compound represented by the formula (1)

$$H_2N-(CH_2)_3-SSO_3H \quad (1)$$

and the metal salt thereof is a 3-aminopropylthiosulfate represented by the formula (2)

$$(H_2N-(CH_2)_3-SSO_3^-)_n \cdot M^{n+} \quad (2)$$

wherein $M^{n+}$ represents a metal ion and n represents a valence thereof.

The metal salt of S-(3-aminopropyl)thiosulfuric acid can be produced according to any known methods. Specific examples thereof include a method comprising reacting a 3-halopropylamine with sodium thiosulfate, and a method comprising reacting potassium salt of phthalic acid with a 1,3-dihalopropane, reacting the compound obtained with sodium thiosulfate and then, hydrolyzing the compound obtained. S-(3-aminopropyl)thiosulfuric acid can be produced by reacting the metal salt of S-(3-aminopropyl)thiosulfuric acid with a protic acid.

In the present invention, a mixture of S-(3-aminopropyl)thiosulfuric acid and the metal sail thereof can be also used. The mixture can be produced by a method comprising mixing S-(3-aminopropyl)thiosulfuric acid and the metal salt thereof, a method comprising converting a part of S-(3-aminopropyl)thiosulfuric acid with metal alkali (a hydroxide, a carbonate and a hydrogen carbonate containing the metal represented by the above-mentioned M) into a metal salt or a method comprising neutralizing a part of the metal of S-(3-aminopropyl)thiosulfuric acid with a protic acid. S-(3-aminopropyl)thiosulfuric acid or the metal salt thereof thus produced can be isolated by an operation such as concentration and crystallization, and S-(3-aminopropyl)thiosulfuric acid or the metal salt thereof isolated usually contains about 0.1% to 5% of water. In the present invention, only S-(3-aminopropyl)thiosulfuric acid can be used, and only the metal salt of S-(3-aminopropyl)thiosulfuric acid can be also used. Plural kinds of the metal salt of S-(3-aminopropyl)thiosulfuric acid can be also used in combination, and S-(3-aminopropyl)thiosulfuric acid and the metal salt thereof can be also used in combination.

As the metal ion represented by $M^{n+}$, lithium ion, sodium ion, potassium ion, cesium ion, cobalt ion, copper ion and zinc ion are preferable, and lithium ion, sodium ion and potassium ion are more preferable. N represents a valence of the metal ion, and it is not limited in so far as it is within a range wherein the metal can have. When, the metal ion is an alkali metal ion such as lithium ion, sodium ion, potassium ion and cesium ion, n is usually 1, and when the metal ion is cobalt ion, n is usually 2 or 3. When the metal ion is copper ion, n is usually an integer of 1 to 3, and when the metal ion is zinc ion, n is usually 2. According to the above-mentioned method, sodium salt of S-(3-aminopropyl)thiosulfuric acid is usually obtained, and it can be converted to a metal salt thereof other than sodium salt thereof by conducting a cation exchange reaction.

A median diameter of S-(3-aminopropyl)thiosulfuric acid and the metal salt thereof is preferably a range of 0.05 to 100 μm, and more preferably a range of 1 to 100 μm. The median diameter can be measured with a laser diffractometry.

The present invention is use of S-(3-aminopropyl)thiosulfuric acid and/or a metal salt thereof for improving the viscoelastic properties of a vulcanized rubber, and it is usually conducted by blending S-(3-aminopropyl)thiosulfuric acid and/or a metal salt thereof on a production of a vulcanized rubber.

The vulcanized rubber usually contains a rubber component, fillers and a sulfur component.

The amount used of S-(3-aminopropyl)thiosulfuric acid or a metal salt is preferably a range of 0.1 to 10 parts by weight per 100 parts of the rubber component in the vulcanized rubber, and more preferably a range of 0.3 to 3 parts by weight.

<Rubber Component>

Examples of the rubber component include natural rubbers, epoxylated natural rubbers, deproteinized rubbers, other modified natural rubber, and various synthetic rubbers such as polyisoprene rubber (IR), styrene-butadiene copolymerized rubbers (SBR), polybutadiene rubbers (BR), acylonitrile-butadiene copolymerized rubbers (NBR), isoprene-isobutylene copolymerized rubbers (IIR), ethylene-propylene-diene copolymerized rubbers (EPDM), and halogenated butyl rubbers (HR). Among them, preferably used are natural rubbers, styrene-butadiene copolymerized rubbers and highly unsaturated rubbers such as polybutadiene rubbers, and natural rubbers are especially preferable. It is also effective that several kinds of rubber components are combined such as a combination of natural rubbers and styrene-butadiene copolymerized rubbers and a combination of natural rubbers and polybutadiene rubbers.

Examples of natural rubbers include natural rubbers of which grade are RSS#1, RSS#3, TSR20 and SIR20. As epoxylated natural rubbers, those of which epoxylated degree is 10 to 60% by mole are preferable, and specific examples thereof include ENR25 and ENR50 manufactured by Kumplan Guthrie. As deproteinized rubbers, deproteinized rubbers in which content of total nitrogen is 0.3% by weight or less are preferable. As modified natural rubber, modified natural rubbers having a polar group, which has been obtained by previously reacting natural rubbers with N,N-dialkylaminoethyl acrylate such as N,N-diethylaminoethyl acrylate, 4-vinylpyridine or 2-hydroxyacrylate, are preferable.

Examples of SBR include emulsion polymerization SBR and solution polymerization SBR described in RUBBER INDUSTRY HANDBOOK, 4th edition edited by Society of Rubber Industry, Japan, at pages 210 to 211. As the rubber composition for tread, solution polymerization SBR is preferable, and solution polymerization SBR of which molecular end has been modified with 4,4'-bis-(dialkylamino)benzophenone such as "Nipol (registered trade mark) NS116" manufactured by ZEON CORPORATION, solution polymerization SBR of which molecular end has been modified with halogenated tin compound such as "SL574" manufactured by JSR, commercially available silane-modified solution polymerization SBR such as "E10" and "E15" manufactured by ASAHI KASEI CORPORATION and solution polymerization SBR having any of nitrogen, tin and silicon, or plural elements thereof at molecular end, obtained by modified its molecular end with a lactam compound, an amide compound, an urea compound, an N,N-alkylacrylamide compound, an isocyanate compound, an imide compound, a silane compound having an alkyl group (a trialkoxysilane compound etc.) or an aminosilane compound, or with different plural compounds such as a combination of a tin compound and a silane compound having an alkyl group and a combination of an alkylacrylamide compound and a silane compound having an alkyl group are especially preferable. Oil extended rubbers wherein oil such as process oil and aroma oil has been added to emulsion polymerization SBR or solution polymerization SBR are preferably used for the rubber composition for tread.

Examples of BR include solution polymerization BR such as highly cis BR in which cis-1,4-bond is 90% or more and low cis BR in which cis bond is around 35%, and low cis BR having high vinyl content is preferable. Tin-modified BR such as "Nipol (registered trade mark) BR 1250H" manufactured by ZEON CORPORATION, solution polymerization BR having any of nitrogen, tin and silicon, or plural elements thereof at molecular end, obtained by modified its molecular end with 4,4'-bis-(dialkylamino)benzophenone, halogenated tin compound, a lactam compound, an amide compound, an urea compound, an N,N-alkylacrylamide compound, an isocyanate compound, an imide compound, a silane compound having an alkyl group (a trialkoxysilane compound etc.) or an aminosilane compound, or with different plural compounds such as a combination of a tin compound and a silane compound having an alkyl group and a combination of an alkylacrylamide compound and a silane compound having an alkyl group are especially preferable. These BR can be used as the rubber composition for tread and for sidewall, and they are usually used to blend with SBR and/or natural rubbers. The ratio of blend in the rubber composition for tread is preferably 60 to 100% by weight of SBR and/or natural rubber and 0 to 40% by weight of BR based on total rubber weight, and the ratio of blend in the rubber composition for sidewall is preferably 10 to 70% by weight of SBR and/or natural rubber and 90 to 30% by weight of BR based on total rubber weight and blend in which ratio is 40 to 60% by weight of natural rubber and 60 to 40% by weight of BR based on total rubber weight is especially preferable. In this case, a blend of modified SBR and non-modified SBR, and a blend of modified BR and non-modified BR are preferable.

<Fillers>

Examples of fillers include carbon black, silica, talc, cray, aluminum hydroxide and titanium hydroxide usually used in rubber field, and carbon black and silica are preferable, and carbon black is especially preferable. Examples of carbon black include those described in RUBBER INDUSTRY HANDBOOK, 4th edition edited by Society of Rubber Industry, Japan, at page 494, and carbon black such as HAF (High Abrasion Furnace), SAF (Super Abrasion Furnace), ISAF (Intermediate SAF), FEF (Fast Extrusion Furnace), MAF, GPF (General Purpose Furnace) and SRF (Semi-Reinforcing Furnace) are preferable. Carbon black having 40 to 250 $m^2/g$ of CTAB (Cetyl Trimethyl Ammonium Bromide) surface area, 20 to 200 $m^2/g$ of nitrogen adsorption specific surface area and 10 to 50 nm of particle diameter is preferably used for the rubber composition for tire tread, and carbon black having 70 to 180 $m^2/g$ of CTAB surface area is more preferable. Specific examples thereof include N110, N220, N234, N299, N326, N330, N330T, N339, N343 and N351 in ASTM standard. Surface finishing carbon black wherein silica has been adhered in 0.1 to 20% by weight on the surface of carbon black is also preferable. It is effective that several kinds of fillers are combined such as a combination of carbon black and silica. It is preferred that only carbon black or both of carbon black and silica is used for the rubber composition for tire tread. Carbon black having 20 to 60 $m^2/g$ of CTAB surface area and 40 to 100 nm of particle diameter is preferably used for the rubber composition for carcass or sidewall. Specific examples thereof include N110, N330, N339, N343, N351, N550, N568, N582, N630, N642, N660, N662, N754 and N762 in ASTM standard. While the used amount of fillers is not limited, it is preferably a range of 5 to 100 parts by weigh per 100 parts by weight of the rubber component. When only carbon black is used as fillers, the used amount of carbon black is more preferably a range of 30 to 80 parts by weight. When carbon black and silica are used in combination for use of tread members, the used amount of carbon black is preferably a range of 5 to 50 parts by weight.

Examples of silica include silica having 50 to 180 $m^2/g$ of CTAB surface area and silica having 50 to 300 $m^2/g$ of nitrogen adsorption specific surface area, and commercially available one such as "AQ" and "AQ-N" manufactured by Tosoh silica, "Ultrasil (registered trade mark) VN3", "Ultrasil (registered trade mark) 360" and "Ultrasil (registered trade mark) 7000" manufactured by Degussa, "Zeosil (registered trade mark) 115GR", "Zeosil (registered trade mark) 1115MP", "Zeosil (registered trade mark) 1205MP" and "Zeosil (registered trade mark) Z85MP" manufactured by Rhodia, and "Nipsil (registered trade mark) AQ" manufactured by Nihon silica are preferably used. Silica of which pH is 6 to 8, silica containing 0.2 to 1.5% by weight of sodium, spherically silica of which sphericity is 1 to 1.3, silica of which surface has been treated with silicone oil such as dimethylsilicone oil, organic silicon compounds containing an ethoxysilyl group or alcohols such as ethanol and polyethylene glycol, two or more kinds of silica having different nitrogen adsorption specific surface areas are preferably blended.

The used amount of fillers is not limited. Silica is preferably used for the rubber composition for tread for cars, the used amount of silica is preferably a range of 10 to 120 parts by weight per 100 parts by weight of the rubber component. When silica is blended, 5 to 50 parts by weight of carbon black is preferably blended per 100 parts by weight of the rubber component, and the blend ratio of silica to carbon black (silica/carbon black) is especially preferably 0.7/1 to 1/0.1.

When silica is used as fillers, a compound having an element such as silicon or having a functional group such as alkoxysilane capable of bonding to silica such as at least one silane coupling agent selected from the group consisting of bis(3-triethoxysilypropyl)tetrasulfide ("Si-69" manufactured by Degussa), bis(3-triethoxysilypropyl)disulfide ("Si-75" manufactured by Degussa), bis(3-diethoxymethylsilypropyl) tetrasulfide, bis(3-diethoxymethylsilypropyl)disulfide, octanoic thioacid S-[3-(triethoxysilyl)propyl]ester ("NXT silane" manufactured by General electronic silicones), octanoic thioacid S-[3-{(2-methyl-1,3-propanedialkoxy) ethoxysilyl}propyl]ester, octanoic thioacid S-[3-{(2-methyl-1,3-propanedialkoxy)methylsilyl}propyl]ester, phenyltriethoxysilane, methyltrimethoxysilane, methyltriethoxysilane, methyltriacetoxysilane, methyltributoxysilane, ethyltrimethoxysilane, ethyltriethoxysilane, isobutyltrimethoxysilane, isobutyltriethoxysilane, n-octyltrimethoxysilane, n-octyltriethoxysilane, vinyltrimethoxysilane, vinyltriethoxysilane, vinyltri(methoxyethoxy)silane, phenyltrimethoxysilane, phenyltriethoxysilane, phenyltriacetoxysilane, 3-methacryloxypropyltrimethoxysilane, 3-methacryloxypropyltriethoxysilane, 3-aminopropyltrimethoxysilane, 3-aminopropyltriethoxysilane, N-(2-aminoethyl)-3-aminopropyltrimethoxysilane, N-(2-aminoethyl)-3-aminopropyltriethoxysilane, (3-glycidoxypropyl) trimethoxysilane, (3-glycidoxypropyl)triethoxysilane, 2-(3, 4-epoxycyclohexyl)ethyltrimethoxysilane, 2-(3,4-epoxycyclohexyl)ethyltriethoxysilane, 3-isocyanatopropyltrimethoxysilane and 3-isocyanatopropyltriethoxysilane is preferably used in combination. Bis(3-triethoxysilypropyl)tetrasulfide ("Si-69" manufactured by Degussa), bis(3-triethoxysilypropyl)disulfide ("Si-75" manufactured by Degussa) and 3-octanoylthiopropyltriethoxysilane ("NXT silane" manufactured by General electronic silicones) are especially preferable. While the step of blending them is not limited, they are preferably blended to rubber at the same step as that of silica, and the blend amount thereof is preferably 2 to 10% by weight per silica, and more preferably 7 to 9% by weight. The temperature of blending is preferably a range of 80 to 200° C., and more preferably a range of 110 to 180° C. When silica is used as fillers, monovalent alcohols such as ethanol, butanol and octanol, divalent or more alcohols such as ethylene glycol, diethylene glycol, triethylene glycol, polyethylene glycol, polypropylene glycol, pentaerythritol and polyetherpolyol, N-alkylamines, amino acids, liquid polybutadiene of which molecular end has been carboxyl-modified or amine-modified or the like is preferably blended in addition to the compound having an element such as silicon or having a functional group such as alkoxysilane capable of bonding to silica and silica.

Examples of aluminum hydroxide include aluminum hydroxide having 5 to 250 $m^2/g$ of nitrogen adsorption specific surface area and aluminum hydroxide having 50 to 100 ml/100 g of DOP feed amount.

<Sulfur Component>

Examples of the sulfur component include powdery sulfur, precipitated sulfur, colloidal sulfur, insoluble sulfur and highly-dispersive sulfur, and powdery sulfur is preferable. In the case of tire members having high amount of sulfur such as belt members, insoluble sulfur is preferable. The sulfur component does not contain S-(3-aminopropyl)sulfuric acid, the metal salt thereof and vulcanization accelerators described below. The used amount of sulfur component is preferably a range of 0.3 to 5 parts by weight per 100 parts by weight of the rubber component, and more preferably a range of 0.5 to 3 parts by weight.

<Zinc Oxide and Vulcanization Accelerators>

Zinc oxide or a vulcanization accelerator is preferably blended to a vulcanized rubber to conduct kneading other than S-(3-aminopropyl)sulfuric acid and/or the metal salt thereof, the rubber component, fillers and the sulfur component. The used amount of zinc oxide is preferably a range of 1 to 15 parts by weight per 100 parts by weight of the rubber component, and more preferably a range of 3 to 8 parts by weight.

Examples of vulcanization accelerators include thiazole-typed vulcanization accelerators, sulfenamide-typed vulcanization accelerators and guanidine-typed vulcanization accelerators described in RUBBER INDUSTRY HANDBOOK, 4th edition published by Society of Rubber Industry, Japan, on Heisei 6, January 20, at pages 412 to 413.

Specific examples thereof include N-cyclohexyl-2-benzothiazolylsulfenamide (CBS), N-tert-butyl-2-benzothiazolylsulfenamide (BBS), N,N-dicyclohexyl-2-benzothiazolylsulfenamide (DCBS), 2-mercaptobenzothiazole (MBT), dibenzothiazyldisulfide (MBTS) and diphenylguanidine (DPG). Morpholinedisulfide known as a vulcanization agent can be also used. When carbon black is used as fillers, any of N-cyclohexyl-2-benzothiazolylsulfenamide (CBS), N-tert-butyl-2-benzothiazolylsulfenamide (BBS), N,N-dicyclohexyl-2-benzothiazolylsulfenamide (DCBS) and 2-mercaptobenzothiazole (MBT), and diphenylguanidine (DPG) are preferably used in combination. When silica and carbon black are used in combination as fillers, any of N-cyclohexyl-2-benzothiazolylsulfenamide (CBS), N-tert-butyl-2-benzothiazolylsulfenamide (BBS), N,N-dicyclohexyl-2-benzothiazolylsulfenamide (DCBS) and dibenzothiazyldisulfide (MBTS), and diphenylguanidine (DPG) are preferably used in combination. The vulcanization accelerators does not contain S-(3-aminopropyl)sulfuric acid and the metal salt thereof.

While the ratio of sulfur and the vulcanization accelerator is not limited, the weight ratio of sulfur to the vulcanization accelerator (sulfur/vulcanization accelerator) is preferably a range of 2/1 to 1/2. EV vulcanization wherein the weight ratio of sulfur/vulcanization accelerator becomes 1 or less is also preferably used in the present invention in use especially needed the improvement of heat resistance.

<Production of Vulcanize Rubber>

Generally, when the vulcanized rubber is produced, its production is basically carried out by three steps. That is, the first step of blending the rubber component, fillers, and if necessary, zinc oxide at a relative high temperature followed by conducting kneading, the second step of blending the sulfur component, and if necessary, the vulcanization accelerator to the kneaded product obtained in the first step at a relative low temperature followed by conducting kneading, and the third step of vulcanizing the kneaded product obtained in the second step at a relative high temperature to obtain the vulcanized rubber.

The first step is preferably carried out at 200° C. or less, and more preferably at 120 to 180° C. The second step is preferably carried out at 60 to 120° C.

While S-(3-aminopropyl)sulfuric acid and/or the metal salt thereof may be used in the second step, it is preferably used in the first step together with fillers and zinc oxide. When S-(3-aminopropyl)sulfuric acid and/or the metal salt thereof is used in the first step, the first step is preferably conducted in a range of 80 to 200° C., and more preferably in a range of 110 to 180° C. When S-(3-aminopropyl)sulfuric acid and/or the metal salt thereof is used in the second step, the second step is preferably conducted in a range of 50 to 100° C.

S-(3-aminopropyl)sulfuric acid and/or the metal salt thereof can be previously blended to a support agent. Examples of the support agent include fillers described above and "inorganic fillers and reinforcing agent" described in RUBBER INDUSTRY HANDBOOK, 4th edition published by Society of Rubber Industry, Japan, at pages 510 to 513. Among them, preferred are carbon black, silica, calcined cray and aluminum hydroxide. While the used amount of the support agent is not limited, it is preferably a range of 10 to 1000 parts by weight per 100 parts by weight of S-(3-aminopropyl) sulfuric acid and/or the metal salt thereof.

The agent for improving the viscoelastic properties previously used in the rubber field can be blended to conduct kneading. Examples thereof include N,N'-bis(2-methyl-2-nitropropyl)-1,6-hexanediamine ("Sumifine (registered trade mark) 1162" manufactured by Sumitomo Chemical co., Ltd.), dithiouracil compounds described in JP S63-23942 A, nitrosoquinoline compounds such as 5-nitroso-8-hydroxyquinoline (NQ-58) described in JP S60-82406 A, alkylphenol-sulfur chloride compounds described in JP 2009-138148 A such as "TACKIROL (registered trade mark) AP, V-200" manufactured by Taoka Chemical Co., Ltd. and "VULTAC 2, 3, 4, 5, 7, 710" manufactured by Penwalt, silane coupling agents such as bis(3-triethoxysilylpropyl)tetrasulfide ("Si-69" manufactured by Degussa), bis(3-triethoxysilylpropyl) disulfide ("Si-75" manufactured by Degussa), bis(3-diethoxymethylsilypropyl)tetrasulfide, bis(3-diethoxymethylsilypropyl)disulfide, octanoic thioacid S-[3-(triethoxysilyl)propyl]ester ("NXT silane" manufactured by General electronic silicones), octanoic thioacid S-[3-{(2-methyl-1,3-propanedialkoxy)ethoxysilyl}propyl]ester, octanoic thioacid S-[3-{(2-methyl-1,3-propanedialkoxy) methylsilyl}propyl]ester, phenyltriethoxysilane, methyltrimethoxysilane, methyltriethoxysilane, methyltriacetoxysilane, methyltributoxysilane, ethyltrimethoxysilane, ethyltriethoxysilane, isobutyltrimethoxysilane, isobutyltriethoxysilane, n-octyltrimethoxysilane, n-octyltriethoxysilane, vinyltrimethoxysilane, vinyltriethoxysilane, vinyltri (methoxyethoxy)silane, phenyltrimethoxysilane, phenyltriethoxysilane, phenyltriacetoxysilane, 3-methacryloxypropyltrimethoxysilane, 3-methacryloxypropyltriethoxysilane, 3-aminopropyltrimethoxysilane, 3-aminopropyltriethoxysilane, N-(2-aminoethyl)-3-aminopropyltrimethoxysilane, N-(2-aminoethyl)-3-aminopropyltriethoxysilane, (3-glycidoxypropyl)trimethoxysilane, (3-glycidoxypropyl)triethoxysilane, 2-(3,4-epoxycyclohexyl)ethyltrimethoxysilane, 2-(3,4-epoxycyclohexyl) ethyltriethoxysilane, 3-isocyanatopropyltrimethoxysilane and 3-isocyanatopropyltriethoxysilane, 1,6-bis(N,N'-dibenzylthiocarbamoyldithio)hexane ("KA9188" manufactured by Bayer), 1,6-hexamethylenedithiosulfate disodium salt dihydrate, 1,3-biscitraconimidemethylbenzene ("Perkalink 900" manufactured by Flexsys), carboxylic hydrazide derivatives such as 1-benzoyl-2-phenylhydrozide, 1- or 3-hydroxy-N'-(1-methylethylidene)-2-naphthoic hydrazide, 1- or 3-hydroxy-N'-(1-methylpropylidene)-2-naphthoic hydrazide described in JP 2004-91505 A, 1- or 3-hydroxy-N'-(1,3-dimethylbutylidene)-2-naphthoic hydrazide and 1- or 3-hydroxy-N'-(2-furylmethylene)-2-naphthoic hydrazide, 3-hydroxy-N'-(1,3-dimethylbutylidene)-2-naphthoic hydrazide, 3-hydroxy-N'-(1,3-diphenylethylidene)-2-naphthoic hydrazide and 3-hydroxy-N'-(1-methylethylidene)-2-naphthoic hydrazide described in JP 2000-190704 A, bismercaptooxadiazole compounds described in JP 2006-328310 A, pyrithione salt compounds described in JP 2009-40898 A, and cobalt hydroxides described in JP 2006-249361 A. Among them, preferred are N,N'-bis(2-methyl-2-nitropropyl)-1,6-hexanediamine ("Sumifine (registered trade mark) 1162" manufactured by Sumitomo Chemical co., Ltd.), 5-nitroso-8-hydroxyquinoline (NQ-58), bis(3-triethoxysilylpropyl)tetrasulfide ("Si-69" manufactured by Degussa), bis(3-triethoxysilylpropyl)disulfide ("Si-75" manufactured by Degussa), 1,6-bis(N,N'-dibenzylthiocarbamoyldithio)-hexane ("KA9188" manufactured by Bayer), hexamethylenedithiosulfate disodium salt dihydrate, 1,3-biscitraconimidemethylbenzene ("Perkalink 900" manufactured by Flexsys), and alkylphenol-sulfur chloride compounds such as "TACKIROL (registered trade mark) AP, V-200" manufactured by Taoka Chemical Co., Ltd. The used amount of agent for improving the viscoelastic properties is preferably 0.1 to 10 parts by weight per 100 parts by weight of the rubber component.

Zinc oxide is preferably blended in the first step, and the vulcanization accelerator is preferably blended in the second step.

Various compounding agents conventionally used in the rubber field can be blended to conduct kneading. Examples of thereof include age resisters; oils; aliphatic acids such as stearic acid; coumarone-indene resins such as coumarone resin NG4 (softening point 81 to 100° C.) manufactured by Nittetsu Kagaku and process resin AC5 (softening point 75° C.) manufactured by KOBE OIL CHEMICAL INDUSTRIAL Co., Ltd.; terpene-typed resins such as terpene resins, terpene-phenol resins and aromatic modified terpene resins; rosin derivatives such as "NIKANOL (registered trade mark) A70" (softening point 70 to 90° C.) manufactured by MITSUBISHI GAS CHEMICAL COMPANY, INC.; hydrogenated rosin derivatives; novolac-typed alkylphenol resins; resol-typed alkylphenol resins; C5-typed petroleum resins; and liquid polybutadiene. These compounding agents may be blended in the first step or in the second step.

Examples of the above-mentioned oils include a process oil and vegetable oil and fat. Examples of the process oil include paraffin-typed process oil, naphthene-typed process oil and aromatic-typed process oil.

Examples of the above-mentioned age resisters include those described in RUBBER INDUSTRY HANDBOOK, 4th edition published by Society of Rubber Industry, Japan, at pages 436 to 443. Among them, preferably used are N-phenyl-N'-1,3-dimethylbutyl-p-phenylenediamine (6PPD), a reaction product of aniline and acetone (TMDQ), poly(2,2,4-trimethyl-1,2-)dihydroquinoline) ("Antioxidant FR" manufactured by Matsubara Sangyo, synthetic waxes (paraffin waxes etc.) and vegetal waxes.

Vulcanization agents conventionally used in the rubber field such as morpholine disulfide can be blended to conduct kneading. These are preferably blended in the second step.

Peptizers or retarders may be blended to conduct kneading, and further, if necessary, various rubber chemicals or softeners may be blended to conduct kneading.

Examples of the retarders include phthalic anhydride, benzoic acid, salicylic acid, N-nitrosodiphenylamine, N-(cyclohexylthio)-phthalimide (CTP), sulfonamide derivatives, diphenylurea and bis(tridecyl)pentaerythritol-diphosphite, and N-(cyclohexylthio)-phthalimide (CTP) is preferable.

While the retarder may be blended in the first step to conduct kneading, it is preferably blended in the second step to conduct kneading. While the used amount of the retarder is not limited, it is preferably a range of 0.01 to 1 parts by weight per 100 parts by weight of the rubber component and more preferably a range of 0.05 to 0.5 parts by weight.

Next, the third step of vulcanizing the kneaded product obtained in the second step will be illustrated.

Vulcanizing is preferably conducted at 120 to 180° C. Vulcanizing is usually carried out at normal pressure or under pressure.

The use of the present invention usually comprises a step of processing the kneaded product to the specific shape before subjecting the kneaded product obtained in the second step to vulcanizing in the third step.

Hereinafter, examples of "step of processing the kneaded product to the specific shape" include "step of covering steel cords" with the kneaded product, "step of covering carcass fiber cords" with the kneaded product, and "step of processing the kneaded product to the shape for tread members" in the tire filed. Each of members obtained in these steps such as a belt, a carcass, an inner liner, a sidewall, a tread (captread or undertread) is usually subjected to a step of molding to a shape of a tire, that is, a step of incorporating the kneaded product into a tire, together with other member or members according to a conventional method in the tire field followed by subjecting to the vulcanization in the third step at the state of an unvulcanized tire containing the kneaded product. The vulcanization is usually conducted under pressure.

As the rubber component in the preferable rubber blend for tread members suitable for large-size tires for trucks, buses, light trucks and construction vehicles, natural rubber alone or a blend of SBR and/or BR and natural rubber containing natural rubber as a main component is preferable. As fillers, carbon black alone or a blend of silica and carbon black containing silica as a main component is preferably used. Further, the agent for improving the viscoelastic properties such as N,N'-bis(2-methyl-2-nitropropyl)-1,6-hexanediamine ("Sumifine (registered trade mark) 1162" manufactured by Sumitomo Chemical co., Ltd.), 5-nitroso-8-hydroxyquinoline (NQ-58), bis(3-triethoxysilylpropyl)tetrasulfide ("Si-69" manufactured by Degussa), bis(3-triethoxysilylpropyl)disulfide ("Si-75" manufactured by Degussa), 1,6-bis(N,N'-dibenzylthiocarbamoyldithio)-hexane ("KA9188" manufactured by Bayer), hexamethylenedithiosulfate disodium salt dihydrate, 1,3-biscitraconimidemethylbenzene ("Perkalink 900" manufactured by Flexsys), and alkylphenol-sulfur chloride compounds such as "TACKIROL (registered trade mark) AP, V-200" manufactured by Taoka Chemical Co., Ltd. is preferably used in combination.

As the rubber component in the preferable rubber blend for tread members suitable for tires for cars, solution polymerization SBR of which molecular end is modified with a silicon compound alone, or a blend of at least one rubber selected from the group consisting of a non-modified solution polymerization SBR, emulsion polymerization SBR, natural rubber and BR and the above-mentioned end-modified solution polymerization SBR containing the above-mentioned end-modified solution polymerization SBR as a main component is preferable. As fillers, a blend of silica and carbon black containing silica as a main component is preferably used. Further, the agent for improving the viscoelastic properties such as N,N'-bis(2-methyl-2-nitropropyl)-1,6-hexanediamine ("Sumifine (registered trade mark) 1162" manufactured by Sumitomo Chemical co., Ltd.), 5-nitroso-8-hydroxyquinoline (NQ-58), bis(3-triethoxysilylpropyl)tetrasulfide ("Si-69" manufactured by Degussa), bis(3-triethoxysilylpropyl)disulfide ("Si-75" manufactured by Degussa), 1,6-bis(N,N'-dibenzylthiocarbamoyldithio)-hexane ("KA9188" manufactured by Bayer), hexamethylenedithiosulfate disodium salt dihydrate, 1,3-biscitraconimidemethylbenzene ("Perkalink 900" manufactured by Flexsys), and alkylphenol-sulfur chloride compounds such as "TACKIROL (registered trade mark) AP, V-200" manufactured by Taoka Chemical Co., Ltd. is preferably used in combination.

As the rubber component in the preferable rubber blend for sidewall members, a blend of at least one rubber selected from the group consisting of a non-modified solution polymerization SBR, emulsion polymerization SBR and natural rubber and BR containing BR as a main component is preferable. As fillers, carbon black alone or a blend of silica and carbon black containing carbon black as a main component is preferably used. Further, the agent for improving the viscoelastic properties such as N,N'-bis(2-methyl-2-nitropropyl)-1,6-hexanediamine ("Sumifine (registered trade mark) 1162" manufactured by Sumitomo Chemical co., Ltd.), 5-nitroso-8-hydroxyquinoline (NQ-58), bis(3-triethoxysilylpropyl) tetrasulfide ("Si-69" manufactured by Degussa), bis(3-triethoxysilylpropyl)disulfide ("Si-75" manufactured by Degussa), 1,6-bis(N,N'-dibenzylthiocarbamoyldithio)-hexane ("KA9188" manufactured by Bayer), hexamethylenedithiosulfate disodium salt dihydrate, 1,3-biscitraconimidemethylbenzene ("Perkalink 900" manufactured by Flexsys), and alkylphenol-sulfur chloride compounds such as "TACKIROL (registered trade mark) AP, V-200" manufactured by Taoka Chemical Co., Ltd. is preferably used in combination.

As the rubber component in the preferable rubber blend for carcass or belt members, natural rubber alone or a blend of BR and natural rubber containing natural rubber as a main component is preferable. As fillers, carbon black alone or a blend of silica and carbon black containing carbon black as a main component is preferably used. Further, the agent for improving the viscoelastic properties such as N,N'-bis(2-methyl-2-nitropropyl)-1,6-hexanediamine ("Sumifine (registered trade mark) 1162" manufactured by Sumitomo Chemical co., Ltd.), 5-nitroso-8-hydroxyquinoline (NQ-58), bis(3-triethoxysilylpropyl)tetrasulfide ("Si-69" manufactured by Degussa), bis(3-triethoxysilylpropyl)disulfide ("Si-75" manufactured by Degussa), 1,6-bis(N,N'-dibenzylthiocarbamoyldithio)-hexane ("KA9188" manufactured by Bayer), hexamethylenedithiosulfate disodium salt dihydrate, 1,3-biscitraconimidemethylbenzene ("Perkalink 900" manufactured by Flexsys), and alkylphenol-sulfur chloride compounds such as "TACKIROL (registered trade mark) AP, V-200" manufactured by Taoka Chemical Co., Ltd. is preferably used in combination.

A pneumatic tire is produced by using the vulcanized rubber thus obtained according to conventional processes. That is, the extruding processing of the rubber composition at the stage before the above-mentioned vulcanization is conducted to obtain a member for tread and then, it is applied and molded on a tire molding machine according to conventional methods to be molded to an unvulcanized tire, and this unvulcanized tire is heated and pressurized in a vulcanizer to obtain a tire.

The fuel consumption of cars equipped with tires thus obtained can be improved, and therefore, low fuel consumption can be accomplished.

EXAMPLES

The present invention will be illustrated in more detail by Examples bellow, but the present invention is not limited to these Examples.

Synthetic Example 1

Production of Sodium Salt of 5-(3-aminopropyl)thiosulfuric Acid

Gas in a reactor was substituted with nitrogen gas. To the reactor, charged were 25 g of 3-bromopropylamine hydrogen bromide salt (0.11 mole), 28.42 g of sodium thiosulfate five hydrate (0.11 mole), 125 ml of methanol and 125 ml of water. The resultant mixture was refluxed at 70° C. for 4.5 hours. The reaction mixture was left to be cooled, and then, methanol was removed therefrom under reduced pressure. To the residue obtained, 4.56 g of sodium hydroxide was added, and the mixture obtained was stirred at room temperature for 30 minutes. After removing the solvent perfectly under reduced pressure, 200 ml of ethanol was added to the residue to reflux for 1 hour. Sodium bromide which was a byproduct was removed by thermal filtration. The filtrate was concentrated under reduced pressure until precipitating crystals, and then, subjected to still standing. The crystals were isolated by filtration, and washed with ethanol and then hexane. The crystals obtained were dried under vacuum to obtain sodium salt of S-(3-aminopropyl)thiosulfuric acid. $^1$H-NMR (270.05 MHz, MeOD) $\delta_{ppm}$: 3.1 (2H, t, J=6.3 Hz), 2.8 (2H, t, J=6.2 Hz), 1.9-2.0 (2H, m)

The median diameter of sodium salt of S-(3-aminopropyl)thiosulfuric acid obtained was measured with a laser diffractometry (its measurement operation was as followed) using SALD-200 J type manufactured by Shimadzu Corporation to find out that the median diameter (50% D) was 66.7 μm. Sodium salt of S-(3-aminopropyl)thiosulfuric acid obtained was pulverized to prepare sodium salt of S-(3-aminopropyl)thiosulfuric acid of which median diameter (50% D) was 14.6 μm. Sodium salt of S-(3-aminopropyl)thiosulfuric acid of which median diameter (50% D) was 14.6 μm was used in Example 1.

<Measurement Operation>

Sodium salt of S-(3-aminopropyl)thiosulfuric acid obtained was dispersed in a mixed solution of the following dispersion solvent (toluene) and the following dispersion agent (10% by weight 2-ethylhexyl sodium sulfosuccinate/toluene solution) at room temperature, and the dispersion liquid obtained was stirred for 5 minutes with irradiating with ultrasonic wave to prepare a test solution. The test solution was transferred to a batch cell, and measurement was carried out after 1 minute (refraction index: 1.70-0.20i).

PH of the aqueous solution obtained by dissolving 10.0 g of sodium salt of S-(3-aminopropyl)thiosulfuric acid in 30 ml of water was 11 to 12.

Example 1

First Step

One hundred (100) parts by weight of natural rubber (RSS#1), 45 parts by weight of HAF (manufactured by Asahi carbon, commodity name "Asahi#70"), 3 parts by weight of stearic acid, 5 parts by weight of zinc oxide and 1 part by weight of sodium salt of S-(3-aminopropyl)thiosulfuric acid obtained in the above-mentioned Synthetic Example 1 were blended to conduct kneading with a Banbury mixer (600 mL Laboplastomill manufactured by Toyo Seiki Seisakusho) to obtain a rubber composition. The step was carried out by conducting kneading at 50 rpm of the rotating speed of the mixer for 5 minutes after adding of each of agents and filler, and the rubber temperature at that time was 180 to 200° C.

Second Step

The rubber composition obtained in the first step, 1 part by weight of the vulcanization accelerator (N-cyclohexyl-2-benzothiazolesulfenamide), 2 parts by weight of sulfur and 1 part of the age resister (N-phenyl-N'-1,3-dimethylbutyl-p-phenylenediamine: commodity name "ANTIGENS (registered trade mark) 6C" manufactured by Sumitomo Chemical Co., Ltd.) were blended to conduct kneading in an open roll at a temperature of 60 to 80° C. to obtain a rubber composition.

Third Step

The rubber composition obtained in the second step was vulcanized at 145° C. to obtain a vulcanized rubber.

Reference Example 1

A vulcanized rubber was obtained according to the same manner as that in Example 1 except that sodium salt of S-(3-aminopropyl)thiosulfuric acid was not used.

Test Example 1

Resilience, tensile characteristics and viscoelastic properties of the vulcanized rubber obtained were measured as followed.

(1) Resilience

Resilience of the vulcanized rubber obtained was measured with a Lubke-typed test machine.

(2) Tensile Characteristics

Tensile characteristics of the vulcanized rubber obtained were measured according to JIS-K6251.

Tensile stress ($M_{200}$) was measured with a dumbbell 3-type.

(3) Viscoelastic Properties

Viscoelastic properties of the vulcanized rubber obtained were measured with a viscoelastic analyzer manufactured by Ueshima Seisakusyo.

Condition: temperature −5° C. to 80° C. (heatup rate: 2° C./minute)

Primary strain 10%, dynamic strain 2.5%, frequency 10 Hz

Compared to the vulcanized rubber obtained in Reference Example 1, resilience of the vulcanized rubber obtained in Example 1 was improved by 11%, tensile stress thereof ($M_{200}$) was improved by 21% and viscoelastic properties thereof (tan δ at 60° C.) was decreased by 13%. The improvement of each of properties was confirmed in each test.

Example 2

First Step

One hundred (100) parts by weight of natural rubber (RSS#1), 45 parts by weight of HAF (manufactured by Asahi carbon, commodity name "Asahi#70"), 3 parts by weight of stearic acid, 5 parts by weight of zinc oxide and 1 part by weight of sodium salt of S-(3-aminopropyl)thiosulfuric acid were blended to conduct kneading with a Banbury mixer (600 mL Laboplastomill manufactured by Toyo Seiki Seisakusho) to obtain a rubber composition. The step was carried out by conducting kneading at 50 rpm of the rotating speed of the mixer for 5 minutes after adding of each of agents and filler, and the rubber temperature at that time was 160 to 175° C.

Second Step

The rubber composition obtained in the first step, 1 part by weight of the vulcanization accelerator (N-cylohexyl-2-benzothiazolesulfenamide (CBS)), 2 parts by weight of sulfur and 1 part of the age resister (N-phenyl-N'-1,3-dimethylbutyl-p-phenylenediamine: commodity name "ANTIGENE (registered trade mark) 6C" manufactured by Sumitomo Chemical Co., Ltd.) were blended to conduct kneading in an open roll at a temperature of 60 to 80° C. to obtain a kneading product.

Third Step

The kneading product obtained in the second step was vulcanized at 145° C. to obtain a vulcanized rubber.

Reference Example 2

A vulcanized rubber was obtained according to the same manner as that in Example 2 except that sodium salt of S-(3-aminopropyl)thiosulfuric acid was not used.

Test Example 2

Resilience, tensile characteristics and viscoelastic properties were measured according to the same manner as that in Test Example 1. Compared to the vulcanized rubber obtained in Reference Example 2, resilience of the vulcanized rubber obtained in Example 2 was improved by 15%, tensile stress thereof ($M_{200}$) was improved by 15% and viscoelastic properties thereof (tan δ at 60° C.) was decreased by 32%. The improvement of each of properties was confirmed in each test.

Example 3

A vulcanized rubber was obtained according to the same manner as that in Example 2 except that 50 parts by weight of natural rubber (RSS#1) and 50 parts by weight of polybutadiene rubber BR-01 manufactured by JSR were used in place of 100 parts by weight of natural rubber (RSS#1).

Reference Example 3

A vulcanized rubber was obtained according to the same manner as that in Example 3 except that sodium salt of S-(3-aminopropyl)thiosulfuric acid was not used.

Test Example 3

Resilience and viscoelastic properties were measured according to the same manner as that in Test Example 1. Compared to the vulcanized rubber obtained in Reference Example 3, resilience of the vulcanized rubber obtained in Example 3 was improved by 8% and viscoelastic properties thereof (tan δ at 60° C.) was decreased by 20%. The improvement of each of properties was confirmed in each test.

Example 4

A vulcanized rubber was obtained according to the same manner as that in Example 2 except that styrene-butadiene copolymer rubber SBR#1500 was used in place of natural rubber (RSS#1).

Reference Example 4

A vulcanized rubber was obtained according to the same manner as that in Example 4 except that sodium salt of S-(3-aminopropyl)thiosulfuric acid was not used.

Test Example 4

Resilience and viscoelastic properties were measured according to the same manner as that in Test Example 1. Compared to the vulcanized rubber obtained in Reference Example 4, resilience of the vulcanized rubber obtained in Example 4 was improved by 2% and viscoelastic properties thereof (tan δ at 60° C.) was decreased by 8%. The improvement of each of properties was confirmed in each test.

Example 5

A vulcanized rubber was obtained according to the same manner as that in Example 2 except that styrene-butadiene copolymer rubber SBR#1723 was used in place of natural rubber (RSS#1).

Reference Example 5

A vulcanized rubber was obtained according to the same manner as that in Example 5 except that sodium salt of S-(3-aminopropyl)thiosulfuric acid was not used.

Test Example 5

Resilience and viscoelastic properties were measured according to the same manner as that in Test Example 1. Compared to the vulcanized rubber obtained in Reference Example 5, resilience of the vulcanized rubber obtained in Example 5 was improved by 9% and viscoelastic properties thereof (tan δ at 60° C.) was decreased by 14%. The improvement of each of properties was confirmed in each test.

Example 6

A vulcanized rubber was obtained according to the same manner as that in Example 2 except that the used amount of sodium salt of S-(3-aminopropyl)thiosulfuric acid was set to 0.5 part by weight.

Test Example 6

Resilience, tensile characteristics and viscoelastic properties were measured according to the same manner as that in Test Example 1. Compared to the vulcanized rubber obtained in Reference Example 2, resilience of the vulcanized rubber obtained in Example 6 was improved by 9%, tensile stress ($M_{200}$) thereof was improved by 8% and viscoelastic properties thereof (tan δ at 60° C.) was decreased by 31%. The improvement of each of properties was confirmed in each test.

Example 7

A vulcanized rubber was obtained according to the same manner as that in Example 2 except that the used amount of sodium salt of S-(3-aminopropyl)thiosulfuric acid was set to 0.5 part by weight, and N,N-dicyclohexyl-2-benzothiazolylsulfenamide (DCBS) was used as the vulcanization accelerator in place of N-cylohexyl-2-benzothiazolylsulfenamide (CBS).

Reference Example 7

A vulcanized rubber was obtained according to the same manner as that in Example 7 except that sodium salt of S-(3-aminopropyl)thiosulfuric acid was not used.

Test Example 7

Resilience and viscoelastic properties were measured according to the same manner as that in Test Example 1. Compared to the vulcanized rubber obtained in Reference Example 7, resilience of the vulcanized rubber obtained in Example 7 was improved by 8% and viscoelastic properties thereof (tan δ at 60° C.) was decreased by 20%. The improvement of each of properties was confirmed in each test.

Example 8

A vulcanized rubber was obtained according to the same manner as that in Example 2 except that the used amount of sodium salt of S-(3-aminopropyl)thiosulfuric acid was set to 0.4 part by weight.

Test Example 8

Resilience, tensile characteristics and viscoelastic properties were measured according to the same manner as that in Test Example 1. Compared to the vulcanized rubber obtained in Reference Example 2, resilience of the vulcanized rubber obtained in Example 8 was improved by 7%, tensile stress thereof ($M_{200}$) was improved by 2% and viscoelastic properties thereof (tan δ at 60° C.) was decreased by 21%. The improvement of each of properties was confirmed in each test.

Example 9

A vulcanized rubber was obtained according to the same manner as that in Example 2 except that the used amount of sodium salt of S-(3-aminopropyl)thiosulfuric acid was set to 0.7 part by weight.

Test Example 9

Resilience, tensile characteristics and viscoelastic properties were measured according to the same manner as that in Test Example 1. Compared to the vulcanized rubber obtained in Reference Example 2, resilience of the vulcanized rubber obtained in Example 9 was improved by 10%, tensile stress thereof ($M_{200}$) was improved by 5% and viscoelastic properties thereof (tan δ at 60° C.) was decreased by 29%. The improvement of each of properties was confirmed in each test.

Example 10

A vulcanized rubber was obtained according to the same manner as that in Example 2 except that the used amount of sodium salt of S-(3-aminopropyl)thiosulfuric acid was set to 1.2 part by weight.

Test Example 10

Resilience, tensile characteristics and viscoelastic properties were measured according to the same manner as that in Test Example 1. Compared to the vulcanized rubber obtained in Reference Example 2, resilience of the vulcanized rubber obtained in Example 10 was improved by 10%, tensile stress thereof ($M_{200}$) was improved by 8% and viscoelastic properties thereof (tan δ at 60° C.) was decreased by 32%. The improvement of each of properties was confirmed in each test.

Example 11

A vulcanized rubber was obtained according to the same manner as that in Example 2 except that the used amount of sodium salt of S-(3-aminopropyl)thiosulfuric acid was set to 2 parts by weight.

Test Example 11

Resilience, tensile characteristics and viscoelastic properties were measured according to the same manner as that in Test Example 1. Compared to the vulcanized rubber obtained in Reference Example 2, resilience of the vulcanized rubber obtained in Example 11 was improved by 11%, tensile stress thereof ($M_{200}$) was improved by 13% and viscoelastic properties thereof (tan δ at 60° C.) was decreased by 27%. The improvement of each of properties was confirmed in each test.

Example 12

A vulcanized rubber was obtained according to the same manner as that in Example 2 except that the used amount of sodium salt of S-(3-aminopropyl)thiosulfuric acid was set to 4 parts by weight.

Test Example 12

Resilience, tensile characteristics and viscoelastic properties were measured according to the same manner as that in Test Example 1. Compared to the vulcanized rubber obtained in Reference Example 2, resilience of the vulcanized rubber obtained in Example 12 was improved by 8%, tensile stress thereof ($M_{200}$) was improved by 6% and viscoelastic properties thereof (tan δ at 60° C.) was decreased by 21%. The improvement of each of properties was confirmed in each test.

Example 13

A vulcanized rubber was obtained according to the same manner as that in Example 2 except that SAF (manufactured by Asahi carbon, commodity name "Asahi#90") was used in place of HAF (manufactured by Asahi carbon, commodity name "Asahi#70").

Reference Example 13

A vulcanized rubber was obtained according to the same manner as that in Example 13 except that sodium salt of S-(3-aminopropyl)thiosulfuric acid was not used.

Test Example 13

Resilience, tensile characteristics and viscoelastic properties were measured according to the same manner as that in Test Example 1. Compared to the vulcanized rubber obtained in Reference Example 13, resilience of the vulcanized rubber obtained in Example 13 was improved by 8%, tensile stress thereof ($M_{200}$) was improved by 12% and viscoelastic properties thereof (tan δ at 60° C.) was decreased by 20%. The improvement of each of properties was confirmed in each test.

Example 14

A vulcanized rubber was obtained according to the same manner as that in Example 2 except that ISAF-HM (manufactured by Asahi carbon, commodity name "Asahi#80") was used in place of HAF (manufactured by Asahi carbon, commodity name "Asahi#70").

Reference Example 14

A vulcanized rubber was obtained according to the same manner as that in Example 14 except that sodium salt of S-(3-aminopropyl)thiosulfuric acid was not used.

Test Example 14

Resilience, tensile characteristics and viscoelastic properties were measured according to the same manner as that in Test Example 1. Compared to the vulcanized rubber obtained in Reference Example 14, resilience of the vulcanized rubber obtained in Example 14 was improved by 8%, tensile stress thereof ($M_{200}$) was improved by 6% and viscoelastic properties thereof (tan δ at 60° C.) was decreased by 21%. The improvement of each of properties was confirmed in each test.

Example 15

A vulcanized rubber was obtained according to the same manner as that in Example 2 except that ISAF-LS (manufactured by Asahi carbon, commodity name "SUNBLACK710") was used in place of HAF (manufactured by Asahi carbon, commodity name "Asahi#70").

Reference Example 15

A vulcanized rubber was obtained according to the same manner as that in Example 15 except that sodium salt of S-(3-aminopropyl)thiosulfuric acid was not used.

Test Example 15

Resilience, tensile characteristics and viscoelastic properties were measured according to the same manner as that in Test Example 1. Compared to the vulcanized rubber obtained in Reference Example 15, resilience of the vulcanized rubber obtained in Example 15 was improved by 9%, tensile stress thereof ($M_{200}$) was improved by 26% and viscoelastic properties thereof (tan δ at 60° C.) was decreased by 20%. The improvement of each of properties was confirmed in each test.

Example 16

A vulcanized rubber was obtained according to the same manner as that in Example 2 except that HAF-LS (manufactured by Asahi carbon, commodity name "Asahi#70L") was used in place of HAF (manufactured by Asahi carbon, commodity name "Asahi#70").

Reference Example 16

A vulcanized rubber was obtained according to the same manner as that in Example 16 except that sodium salt of S-(3-aminopropyl)thiosulfuric acid was not used.

Test Example 16

Resilience, tensile characteristics and viscoelastic properties were measured according to the same manner as that in Test Example 1. Compared to the vulcanized rubber obtained in Reference Example 16, resilience of the vulcanized rubber obtained in Example 16 was improved by 7%, tensile stress thereof ($M_{200}$) was improved by 4% and viscoelastic properties thereof (tan δ at 60° C.) was decreased by 19%. The improvement of each of properties was confirmed in each test.

Example 17

A vulcanized rubber was obtained according to the same manner as that in Example 2 except that FEF (manufactured by Asahi carbon, commodity name "Asahi#60") was used in place of HAF (manufactured by Asahi carbon, commodity name "Asahi#70").

Reference Example 17

A vulcanized rubber was obtained according to the same manner as that in Example 17 except that sodium salt of S-(3-aminopropyl)thiosulfuric acid was not used.

Test Example 17

Resilience, tensile characteristics and viscoelastic properties were measured according to the same manner as that in Test Example 1. Compared to the vulcanized rubber obtained in Reference Example 17, resilience of the vulcanized rubber obtained in Example 17 was improved by 9%, tensile stress thereof ($M_{200}$) was improved by 3% and viscoelastic properties thereof (tan δ at 60° C.) was decreased by 22%. The improvement of each of properties was confirmed in each test.

Example 18

First Step

One hundred (100) parts by weight of natural rubber (RSS#1), 45 parts by weight of HAF (manufactured by Asahi carbon, commodity name "Asahi#70"), 3 parts by weight of stearic acid, 5 parts by weight of zinc oxide and 0.4 part by weight of sodium salt of S-(3-aminopropyl)thiosulfuric acid were blended to conduct kneading with a Banbury mixer (600 mL Laboplastomill manufactured by Toyo Seiki Seisakusho) to obtain a rubber composition. The step was carried out by conducting kneading at 50 rpm of the rotating speed of the mixer for 5 minutes after adding of each of agents and filler, and the rubber temperature at that time was 160 to 175° C.

Second Step

The rubber composition obtained in the first step, 1 part by weight of the vulcanization accelerator (N-cyclohexyl-2-benzothiazolesulfenamide (CBS)), 2 parts by weight of sulfur, 1 part of the age resister (N-phenyl-N'-1,3-dimethylbutyl-p-phenylenediamine: commodity name "ANTIGENS (registered trade mark) 6C" manufactured by Sumitomo Chemical Co., Ltd.) and 0.1 part by weight of N-(cyclohexylthio)-phthalimide were blended to conduct kneading in an open roll at a temperature of 60 to 80° C. to obtain a rubber composition.

Third Step

The rubber composition obtained in the second step was vulcanized at 145° C. to obtain a vulcanized rubber.

Reference Example 18

A vulcanized rubber was obtained according to the same manner as that in Example 18 except that sodium salt of S-(3-aminopropyl)thiosulfuric acid and N-(cyclohexylthio)-phthalimide were not used.

Reference Example 19

A vulcanized rubber was obtained according to the same manner as that in Example 18 except that N-(cyclohexylthio)-phthalimide was not used.

Test Example 18

Resilience, tensile characteristics and viscoelastic properties were measured according to the same manner as that in Test Example 1. Compared to the vulcanized rubber obtained in Reference Example 18, resilience of the vulcanized rubber obtained in Example 18 was improved by 7%, tensile stress thereof ($M_{200}$) was improved by 1% and viscoelastic properties thereof (tan δ at 60° C.) was decreased by 23%. The improvement of each of properties was confirmed in each test.

Scorch time of the vulcanized rubber was measured with Mooney viscometer manufactured by Toyo Seiki Seisakusho according to JIS-K6200-1. As the result, compared to the vulcanized rubber obtained in Reference Example 19, scorch time (t5) of the vulcanized rubber obtained in Example 18 was improved by 13%, and the improvement of properties was confirmed.

Example 19

A vulcanized rubber was obtained according to the same manner as that in Example 18 except that the used amount of N-(cyclohexylthio)-phthalimide was set to 0.2 parts by weight.

Test Example 19

Resilience, tensile characteristics and viscoelastic properties were measured according to the same manner as that in Test Example 1. Compared to the vulcanized rubber obtained in Reference Example 18, resilience of the vulcanized rubber obtained in Example 19 was improved by 6%, tensile stress thereof ($M_{200}$) was improved by 2% and viscoelastic properties thereof (tan δ at 60° C.) was decreased by 28%. The improvement of each of properties was confirmed in each test.

Scorch time of the vulcanized rubber was measured with Mooney viscometer manufactured by Toyo Seiki Seisakusho according to JIS-K6200-1. As the result, compared to the vulcanized rubber obtained in Reference Example 19, scorch time (t5) of the vulcanized rubber obtained in Example 19 was improved by 38%, and the improvement of properties was confirmed.

Example 20

First Step

One hundred (100) parts by weight of natural rubber (RSS#1), 45 parts by weight of HAF (manufactured by Asahi carbon, commodity name "Asahi#70"), 3 parts by weight of stearic acid, 5 parts by weight of zinc oxide, 1 part of the age resister (N-phenyl-N'-1,3-dimethylbutyl-p-phenylenediamine: commodity name "ANTIGENE (registered trade mark) 6C" manufactured by Sumitomo Chemical Co., Ltd.) and 0.4 part by weight of sodium salt of S-(3-aminopropyl)thiosulfuric acid were blended to conduct kneading with a Banbury mixer (600 ml Laboplastomill manufactured by Toyo Seiki Seisakusho) to obtain a rubber composition. The step was carried out by conducting kneading at 50 rpm of the rotating speed of the mixer for 5 minutes after adding of each of agents and filler, and the rubber temperature at that time was 160 to 175° C.

Second Step

The rubber composition obtained in the first step, 1 part by weight of the vulcanization accelerator (N-cyclohexyl-2-benzothiazolesulfenamide (CBS)) and 2 parts by weight of sulfur were blended to conduct kneading in an open roll at a temperature of 60 to 80° C. to obtain a rubber composition.

Third Step

The rubber composition obtained in the second step was vulcanized at 145° C. to obtain a vulcanized rubber.

Reference Example 20

A vulcanized rubber was obtained according to the same manner as that in Example 20 except that sodium salt of S-(3-aminopropyl)thiosulfuric acid was not used.

Test Example 20

Resilience, tensile characteristics and viscoelastic properties were measured according to the same manner as that in Test Example 1. Compared to the vulcanized rubber obtained in Reference Example 20, resilience of the vulcanized rubber obtained in Example 20 was improved by 6%, tensile stress thereof ($M_{200}$) was improved by 3% and viscoelastic properties thereof (tan δ at 60° C.) was decreased by 23%. The improvement of each of properties was confirmed in each test.

Example 21

A vulcanized rubber was obtained according to the same manner as that in Example 2 except that the used amount of sodium salt of S-(3-aminopropyl)thiosulfuric acid was set to 0.4 part by weight, and N-t-butyl-2-benzothiazolesulfenamide (BBS) was used as the vulcanization accelerator in place of N-cyclohexyl-2-benzothiazolesulfenamide (CBS).

Reference Example 21

A vulcanized rubber was obtained according to the same manner as that in Example 21 except that sodium salt of S-(3-aminopropyl)thiosulfuric acid was not used.

Test Example 21

Resilience and viscoelastic properties were measured according to the same manner as that in Test Example 1. Compared to the vulcanized rubber obtained in Reference Example 21 resilience of the vulcanized rubber obtained in Example 21 was improved by 7 and viscoelastic properties thereof (tan δ at 60° C.) was decreased by 16 The improvement of each of properties was confirmed in each test.

Example 22

First Step

One hundred (100) parts by weight of natural rubber (RSS#1), 45 parts by weight of HAF (manufactured by Asahi carbon, commodity name "Asahi#70"), 3 parts by weight of stearic acid, 5 parts by weight of zinc oxide, 5 parts of aromatic process oil (Diana Process Oil AH-12 manufactured by Idemitsu Kosan Co., Ltd.) and 0.4 part by weight of sodium salt of S-(3-aminopropyl)thiosulfuric acid were blended to conduct kneading with a Banbury mixer (600 ml Laboplastomill manufactured by Toyo Seiki Seisakusho) to obtain a rubber composition. The step was carried out by conducting kneading at 50 rpm of the rotating speed of the mixer for 5 minutes after adding of each of agents and filler, and the rubber temperature at that time was 160 to 175° C.

Second Step

The rubber composition obtained in the first step, 1 part by weight of the vulcanization accelerator (N-cyclohexyl-2-benzothiazolesulfenamide (CBS)), 2 parts by weight of sulfur and 1 part of the age resister (N-phenyl-N'-1,3-dimethylbutyl-p-phenylenediamine: commodity name "ANTIGENS (registered trade mark) 6C" manufactured by Sumitomo Chemical Co., Ltd.) were blended to conduct kneading in an open roll at a temperature of 60 to 80° C. to obtain a rubber composition.

Third Step

The rubber composition obtained in the second step was vulcanized at 145° C. to obtain a vulcanized rubber.

Reference Example 22

A vulcanized rubber was obtained according to the same manner as that in Example 22 except that sodium salt of S-(3-aminopropyl)thiosulfuric acid was not used.

Test Example 22

Resilience, tensile characteristics and viscoelastic properties were measured according to the same manner as that in Test Example 1. Compared to the vulcanized rubber obtained in Reference Example 22, resilience of the vulcanized rubber obtained in Example 22 was improved by 8%, tensile stress thereof ($M_{200}$) was improved by 6% and viscoelastic properties thereof (tan δ at 60° C.) was decreased by 19%. The improvement of each of properties was confirmed in each test.

Example 23

A vulcanized rubber was obtained according to the same manner as that in Example 22 except that naphthene-typed process oil (Diana Process Oil NM-280 manufactured by Idemitsu Kosan Co., Ltd.) was used in place of aromatic process oil.

Reference Example 23

A vulcanized rubber was obtained according to the same manner as that in Example 23 except that sodium salt of S-(3-aminopropyl)thiosulfuric acid was not used.

Test Example 23

Resilience, tensile characteristics and viscoelastic properties were measured according to the same manner as that in Test Example 1. Compared to the vulcanized rubber obtained in Reference Example 23, resilience of the vulcanized rubber obtained in Example 23 was improved by 4%, tensile stress thereof ($M_{200}$) was improved by 5% and viscoelastic properties thereof (tan δ at 60° C.) was decreased by 16%. The improvement of each of properties was confirmed in each test.

Example 24

A vulcanized rubber was obtained according to the same manner as that in Example 22 except that paraffin-typed process oil (Diana Process Oil PW-90 manufactured by Idemitsu Kosan Co., Ltd.) was used in place of aromatic process oil.

Reference Example 24

A vulcanized rubber was obtained according to the same manner as that in Example 24 except that sodium salt of S-(3-aminopropyl)thiosulfuric acid was not used.

Test Example 24

Resilience, tensile characteristics and viscoelastic properties were measured according to the same manner as that in Test Example 1. Compared to the vulcanized rubber obtained in Reference Example 24, resilience of the vulcanized rubber obtained in Example 24 was improved by 6%, tensile stress thereof ($M_{200}$) was improved by 3% and viscoelastic properties thereof (tan δ at 60° C.) was decreased by 19%. The improvement of each of properties was confirmed in each test.

Example 25

First Step

One hundred (100) parts by weight of natural rubber (RSS#1), 45 parts by weight of HAF (manufactured by Asahi carbon, commodity name "Asahi#70"), 3 parts by weight of stearic acid, 5 parts by weight of zinc oxide and 0.4 part by weight of sodium salt of S-(3-aminopropyl)thiosulfuric acid were blended to conduct kneading with a Banbury mixer (600 ml Laboplastomill manufactured by Toyo Seiki Seisakusho) to obtain a rubber composition. The step was carried out by conducting kneading at 50 rpm of the rotating speed of the mixer for 5 minutes after adding of each of agents and filler, and the rubber temperature at that time was 160 to 175° C.

Second Step

The rubber composition obtained in the first step, 1 part by weight of the vulcanization accelerator (N-cyclohexyl-2-benzothiazolesulfenamide (CBS)), 2 parts by weight of sulfur and 1 part of the age resister (N-phenyl-N'-1,3-dimethylbutyl-p-phenylenediamine: commodity name "ANTIGENE (registered trade mark) 6C" manufactured by Sumitomo Chemical Co., Ltd.) were blended to conduct kneading in an open roll at a temperature of 60 to 80° C. to obtain a rubber composition.

Third Step

The rubber composition obtained in the second step was vulcanized at 145° C. to obtain a vulcanized rubber.

Reference Example 25

A vulcanized rubber was obtained according to the same manner as that in Example 25 except that sodium salt of S-(3-aminopropyl)thiosulfuric acid was not used.

Test Example 25

Resilience, tensile characteristics and viscoelastic properties were measured according to the same manner as that in Test Example 1. Compared to the vulcanized rubber obtained in Reference Example 25, resilience of the vulcanized rubber obtained in Example 25 was improved by 6%, tensile stress thereof ($M_{200}$) was improved by 3% and viscoelastic properties thereof (tan δ at 60° C.) was decreased by 19%. The improvement of each of properties was confirmed in each test.

Example 26

A vulcanized rubber was obtained according to the same manner as that in Example 25 except that the rubber temperature on kneading in the first step was set to 140 to 160° C.

Reference Example 26

A vulcanized rubber was obtained according to the same manner as that in Example 26 except that sodium salt of S-(3-aminopropyl)thiosulfuric acid was not used.

Test Example 26

Resilience and viscoelastic properties were measured according to the same manner as that in Test Example 1. Compared to the vulcanized rubber obtained in Reference Example 26, resilience of the vulcanized rubber obtained in Example 26 was improved by 7% and viscoelastic properties thereof (tan δ at 60° C.) was decreased by 14%. The improvement of each of properties was confirmed in each test.

Example 27

A vulcanized rubber was obtained according to the same manner as that in Example 25 except that the rubber temperature on kneading in the first step was set to 120 to 140° C.

Reference Example 27

A vulcanized rubber was obtained according to the same manner as that in Example 27 except that sodium salt of S-(3-aminopropyl)thiosulfuric acid was not used.

Test Example 27

Resilience, tensile characteristics and viscoelastic properties were measured according to the same manner as that in Test Example 1. Compared to the vulcanized rubber obtained in Reference Example 27, resilience of the vulcanized rubber obtained in Example 27 was improved by 6%, tensile stress thereof ($M_{200}$) was improved by 6% and viscoelastic properties thereof (tan δ at 60° C.) was decreased by 23%. The improvement of each of properties was confirmed in each test.

Example 28

First Step

Sodium salt of S-(3-aminopropyl)thiosulfuric acid and carbon black manufactured by Tokai carbon were mixed in a weight ratio of 40/60 (sodium salt of S-(3-aminopropyl)thiosulfuric acid/carbon black) using a sample mill (SK-M3 Type manufactured by Kyoritsu Riko) followed by stirring to obtain a mixture.

One part of the mixture obtained above, 100 parts by weight of natural rubber (RSS#1), 45 parts by weight of HAF (manufactured by Asahi carbon, commodity name "Asahi#70"), 3 parts by weight of stearic acid and 5 parts by weight of zinc oxide were blended to conduct kneading with a Banbury mixer (600 ml Laboplastomill manufactured by Toyo Seiki Seisakusho) to obtain a rubber composition. The step was carried out by conducting kneading at 50 rpm of the rotating speed of the mixer for 5 minutes after adding of each of agents and filler, and the rubber temperature at that time was 160 to 175° C.

Second Step

The rubber composition obtained in the first step, 1 part by weight of the vulcanization accelerator (N-cyclohexyl-2-benzothiazolesulfenamide (CBS)), 2 parts by weight of sulfur and 1 part of the age resister (N-phenyl-N'-1,3-dimethylbutyl-p-phenylenediamine: commodity name "ANTIGENS (registered trade mark) 6C" manufactured by Sumitomo Chemical Co., Ltd.) were blended to conduct kneading in an open roll at a temperature of 60 to 80° C. to obtain a rubber composition.

Third Step

The rubber composition obtained in the second step was vulcanized at 145° C. to obtain a vulcanized rubber.

Reference Example 28

A vulcanized rubber was obtained according to the same manner as that in Example 28 except that sodium salt of S-(3-aminopropyl)thiosulfuric acid was not used.

Test Example 28

Viscoelastic properties was measured according to the same manner as that in Test Example 1. Compared to the vulcanized rubber obtained in Reference Example 28, viscoelastic properties of the vulcanized rubber obtained in Example 28 (tan δ at 60° C.) was decreased by 18%, and the improvement of properties was confirmed.

Synthetic Example 2

Production of S-(3-aminopropyl)thiosulfuric Acid

Gas in a reactor was substituted with nitrogen gas. To the reactor, charged were 26.0 g of sodium salt of S-(3-aminopropyl)thiosulfuric acid and 45 ml of water. To the resultant mixture, 5 mol/l hydrochloric acid was further added to adjust pH of the solution to 5 to 6. The solution was concentrated under reduced pressure until precipitating crystals, and then, subjected to still standing. The crystals were isolated by filtration and dried under vacuum to obtain S-(3-aminopropyl) thiosulfuric acid.

$^1$H-NMR (270.05 MHz, MeOD) $\delta_{ppm}$: 3.0-3.1 (4H, m), 2.0-2.1 (2H, m)

Example 29

A vulcanized rubber was obtained according to the same manner as that in Example 1 except that 0.4 part by weight of S-(3-aminopropyl)thiosulfuric acid obtained in the above-mentioned Synthetic Example 2 was used in place of 1 part by weight of sodium salt of S-(3-aminopropyl)thiosulfuric acid obtained in the above-mentioned Synthetic Example 1, and the rubber temperature on kneading in the first step was set to 160 to 180° C.

Reference Example 29

A vulcanized rubber was obtained according to the same manner as that in Example 29 except that S-(3-aminopropyl) thiosulfuric acid was not used.

Test Example 29

Viscoelastic properties was measured according to the same manner as that in Test Example 1. Compared to the vulcanized rubber obtained in Reference Example 29, resilience of the vulcanized rubber obtained in Example 29 was improved by 3% and viscoelastic properties thereof (tan δ at 60° C.) was decreased by 23%. The improvement of each of properties was confirmed in each test.

Synthetic Example 3

Production of Mixture of S-(3-aminopropyl)thiosulfuric Acid and Sodium Salt Thereof Gas in a reactor was substituted with nitrogen gas. To the reactor, charged were 10.0 g of S-(3-aminopropyl)thiosulfuric acid and 30 ml of water. To the resultant mixture, 0.6 ml of 1 mol/l sodium hydroxide solution was further added to adjust pH of the solution to 7 to 8. The solution was concentrated under reduced pressure followed by conducting drying under vacuum to obtain a mixture of S-(3-aminopropyl)thiosulfuric acid and sodium salt thereof.

Synthetic Example 4

Production of Mixture of S-(3-aminopropyl)thiosulfuric Acid and Sodium Salt Thereof A mixture of 5-(3-aminopropyl)thiosulfuric acid and sodium salt thereof was obtained according to the same manner as that in Synthetic Example 3 except that the used amount of 1 mol/l sodium hydroxide solution was set to 2.9 ml and pH of the solution obtained was adjusted to 8 to 9.

Synthetic Example 5

Production of Mixture of S-(3-aminopropyl)thiosulfuric Acid and Sodium Salt Thereof A mixture of 5-(3-aminopropyl)thiosulfuric acid and sodium salt thereof was obtained according to the same manner as that in Synthetic Example 3 except that the used amount of 1 mol/l sodium hydroxide solution was set to 14.6 ml and pH of the solution obtained was adjusted to 9 to 10.

Synthetic Example 6

Production of Mixture of S-(3-aminopropyl)thiosulfuric Acid and Sodium Salt Thereof A mixture of 5-(3-aminopropyl)thiosulfuric acid and sodium salt thereof was obtained according to the same manner as that in Synthetic Example 3 except that the used amount of 1 mol/l sodium hydroxide solution was set to 43.8 ml and pH of the solution obtained was adjusted to 10 to 11.

Examples 30 to 33

A vulcanized rubber was obtained according to the same manner as that in Example 29 except that each of the mixtures of S-(3-aminopropyl)thiosulfuric acid and sodium salt thereof obtained in Synthetic Examples 3 to 6 was used in place of S-(3-aminopropyl)thiosulfuric acid.

Test Examples 30 to 33

Resilience and viscoelastic properties were measured according to the same manner as that in Test Example 1. Compared to the vulcanized rubber obtained in Reference Example 29, each of change rates of resilience and viscoelastic properties (tan δ at 60° C.) are shown in Table 1.

TABLE 1

| | Test Ex. 30 | Test Ex. 31 | Test Ex. 32 | Test Ex. 33 |
|---|---|---|---|---|
| Mixture used | Mixture obtained in Synthetic Example 3 | Mixture obtained in Synthetic Example 4 | Mixture obtained in Synthetic Example 5 | Mixture obtained in Synthetic Example 6 |
| pH on preparing mixture | 7 to 8 | 8 to 9 | 9 to 10 | 10 to 11 |
| Resilience | Δ1% | Δ4% | Δ4% | Δ4% |
| Viscoelastic properties | ▲12% | ▲15% | ▲18% | ▲23% |

In Table 1, Δ shows that resilience was improved compared to the vulcanized rubber obtained in Reference Example 29, and ▲ shows that tan δ was decreased compared to the vulcanized rubber obtained in Reference Example 29. The improvement of each of properties was confirmed in each test.

Examples 34 to 38

Each of sodium salts S-(3-aminopropyl)thiosulfuric acid having median diameters (50% D) were described in Table 2 was prepared by pulverization or the like, and vulcanized rubbers were obtained according to the same manner as that in Example 8.

Test Examples 34 to 38

Resilience and viscoelastic properties were measured according to the same manner as that in Test Example 1. Compared to the vulcanized rubber obtained in Reference Example 2, each of change rates of resilience and viscoelastic properties (tan δ at 60° C.) are shown in Table 2.

TABLE 2

|  | Test Ex. 34 | Test Ex. 35 | Test Ex. 36 | Test Ex. 37 | Test Ex. 38 |
|---|---|---|---|---|---|
| Median diameter | 10 μm | 19 μm | 34 μm | 36 μm | 67 μm |
| Resilience | Δ9% | Δ7% | Δ6% | Δ7% | Δ6% |
| Viscoelastic properties | ▲24% | ▲23% | ▲23% | ▲21% | ▲20% |

In Table 2, Δ shows that resilience was improved compared to the vulcanized rubber obtained in Reference Example 2, and ▲ shows that tan δ was decreased compared to the vulcanized rubber obtained in Reference Example 2.

Example 39

A belt is obtained by coating steel cords plated with brass with the kneaded product obtained in any second steps of Examples 1 to 38. An unvulcanized tire is molded using the obtained belt according to a conventional process and the unvulcanized tire obtained is heated and pressurized in a vulcanizer to obtain a tire.

Example 40

The extruding processing of the kneaded product obtained in any second steps of Examples 1 to 38 is conducted to obtain a member for tread. An unvulcanized tire is molded by using the obtained tread according to a conventional process and the unvulcanized tire obtained is heated and pressurized in a vulcanizer to obtain a tire.

Example 41

The extruding processing of the kneaded product obtained in any second steps of Examples 1 to 38 is conducted to prepare a kneaded product having a shape fitting on the carcass shape and it is applied up and down carcass fiber cord made of polyester to obtain a carcass. An unvulcanized tire is molded by using the obtained carcass according to a conventional process and the unvulcanized tire obtained is heated and pressurized in a vulcanizer to obtain a tire.

Example 42

A vulcanized rubber is obtained according to the same manner as that in Example 2 except that 0.2 part of N-(cyclohexylthio)-phthalimide is further blended to conduct kneading in the second step of Example 2.

Example 43

A vulcanized rubber obtained in the following first step to third step is suitable for captread.

<First Step>
One hundred (100) parts by weight of styrene-butadiene copolymer rubber SBR #1502 manufactured by Sumitomo Chemical Co., Ltd., 45 parts by weight of ISAF-HM (manufactured by Asahi carbon, commodity name "Asahi#80"), 2 parts by weight of stearic acid and 3 parts by weight of zinc oxide, 1 part of sodium salt of S-(3-aminopropyl)thiosulfuric acid, 1 part of the age resister (N-phenyl-N'-1,3-dimethylbutyl-p-phenylenediamine: commodity name "ANTIGENE (registered trade mark) 6C" manufactured by Sumitomo Chemical Co., Ltd.) and 2 parts of wax ("OZOACE-0355" manufactured by Nippon Seiro Co., Ltd.) are blended to conduct kneading with a Banbury mixer (600 ml Laboplastomill manufactured by Toyo Seiki Seisakusho) to obtain a rubber composition. The step is carried out by conducting kneading at 50 rpm of the rotating speed of the mixer for 5 minutes after adding of each of agents and filler, and the rubber temperature at that time is 160 to 175° C.
<Second Step>
The rubber composition obtained in the first step, 3 parts by weight of the vulcanization accelerator (N-cyclohexyl-2-benzothiazolesulfenamide (CBS)) and 2 parts by weight of sulfur and are blended to conduct kneading in an open roll at a temperature of 60 to 80° C. to obtain a kneaded product.
<Third Step>
The kneaded product obtained in the second step is vulcanized at 145° C. to obtain a vulcanized rubber.

Example 44

A vulcanized rubber obtained in the following first step to third step is suitable for undertread.
<First Step>
One hundred (100) parts by weight of styrene-butadiene copolymer rubber SBR #1502 manufactured by Sumitomo Chemical Co., Ltd., 35 parts by weight of ISAF-HM (manufactured by Asahi carbon, commodity name "Asahi#80"), 2 parts by weight of stearic acid and 3 parts by weight of zinc oxide, 1 part of sodium salt of S-(3-aminopropyl)thiosulfuric acid, 1 part of the age resister (N-phenyl-N'-1,3-dimethylbutyl-p-phenylenediamine: commodity name "ANTIGENS (registered trade mark) 6C" manufactured by Sumitomo Chemical Co., Ltd.) and 2 parts of wax ("OZOACE-0355" manufactured by Nippon Seiro Co., Ltd.) are blended to conduct kneading with a Banbury mixer (600 ml Laboplastomill manufactured by Toyo Seiki Seisakusho) to obtain a rubber composition. The step is carried out by conducting kneading at 50 rpm of the rotating speed of the mixer for 5 minutes after adding of each of agents and filler, and the rubber temperature at that time is 160 to 175° C.
<Second Step>
The rubber composition obtained in the first step, 2 parts by weight of the vulcanization accelerator (N-cyclohexyl-2-benzothiazolesulfenamide (CBS)), 0.5 part by weight of the vulcanization accelerator, diphenylguanidine (DPG), 0.8 part by weight of the vulcanization accelerator, dibenzothiazyldisulfide (MBTS) and 1 part by weight of sulfur are blended to conduct kneading in an open roll at a temperature of 60 to 80° C. to obtain a kneaded product.
<Third Step>
The kneaded product obtained in the second step is vulcanized at 145° C. to obtain a vulcanized rubber.

Example 45

A vulcanized rubber obtained in the following first step to third step is suitable for belt.

<First Step>

One hundred (100) parts by weight of natural rubber (RSS#1), 45 parts by weight of HAF (manufactured by Asahi carbon, commodity name "Asahi#70"), 3 parts by weight of stearic acid and 5 parts by weight of zinc oxide, 1 part of sodium salt of S-(3-aminopropyl)thiosulfuric acid, 10 parts of hydrous silica ("Nipsil (registered trade mark) AQ" manufactured by Tosoh silica), 2 parts of the age resister FR ("Antioxidant FR" manufactured by Matsubara Sangyo), 2 parts of resorcin and 2 parts of cobalt naphthenate are blended to conduct kneading with a Banbury mixer (600 ml Laboplastomill manufactured by Toyo Seiki Seisakusho) to obtain a rubber composition. The step is carried out by conducting kneading at 50 rpm of the rotating speed of the mixer for 5 minutes after adding of each of agents and filler, and the rubber temperature at that time is 160 to 175° C.

<Second Step>

The rubber composition obtained in the first step, 1 part by weight of the vulcanization accelerator (N,N-dicyclohexyl-2-benzothiazolesulfenamide (DCBS)), 6 parts by weight of sulfur and 3 parts of methoxylated methilol melamine resin ("SUmikanol507AP" manufactured by Sumitomo Chemical Co., Ltd.) are blended to conduct kneading in an open roll at a temperature of 60 to 80° C. to obtain a kneaded product.

<Third Step>

The kneaded product obtained in the second step is vulcanized at 145° C. to obtain a vulcanized rubber.

Example 46

A vulcanized rubber obtained in the following first step to third step is suitable for inner liners.

<First Step>

One hundred (100) parts by weight of halogenated butyl rubber ("Br-IIR2255" manufactured by Exxon Mobile), 60 parts by weight of GPF, 1 part by weight of stearic acid, 3 parts by weight of zinc oxide, 1 part of sodium salt of S-(3-aminopropyl)thiosulfuric acid and 10 parts of paraffin oil ("Diana Process Oil" manufactured by Idemitsu Kosan Co., Ltd.) are blended to conduct kneading with a Banbury mixer (600 ml Laboplastomill manufactured by Toyo Seiki Seisakusho) to obtain a rubber composition. The step is carried out by conducting kneading at 50 rpm of the rotating speed of the mixer for 5 minutes after adding of each of agents and filler, and the rubber temperature at that time is 160 to 175° C.

<Second Step>

The rubber composition obtained in the first step, 1 part by weight of the vulcanization accelerator (condensation product of aniline and acetone (TMDQ)), 1 part by weight of the vulcanization accelerator, dibenzothiazyldisulfide (MBTS) and 2 parts by weight of sulfur are blended to conduct kneading in an open roll at a temperature of 60 to 80° C. to obtain a kneaded product.

<Third Step>

The kneaded product obtained in the second step is vulcanized at 145° C. to obtain a vulcanized rubber.

Example 47

A vulcanized rubber obtained in the following first step to third step is suitable for sidewalls.

<First Step>

Forty (40) parts by weight of natural rubber ("RSS#3"), 60 parts of polybutadiene rubber ("BR150B" manufactured by Ube Kosan), 50 parts by weight of FEF, 2.5 parts by weight of stearic acid, 3 parts by weight of zinc oxide, 1 part of sodium salt of S-(3-aminopropyl)thiosulfuric acid, 2 parts of the age resister (N-phenyl-N'-1,3-dimethylbutyl-p-phenylenediamine: commodity name "ANTIGENS (registered trade mark) 6C" manufactured by Sumitomo Chemical Co., Ltd.), 10 parts of aromatic oil ("NC-140" manufactured by Cosmo Oil Co., Ltd.) and 2 parts of wax ("SANNOC (register trade mark) WAX" manufactured by OUCHI SHINKO CHEMICAL INDUSTRIAL) are blended to conduct kneading with a Banbury mixer (600 ml Laboplastomill manufactured by Toyo Seiki Seisakusho) to obtain a rubber composition. The step is carried out by conducting kneading at 50 rpm of the rotating speed of the mixer for 5 minutes after adding of each of agents and filler, and the rubber temperature at that time is 160 to 175° C.

<Second Step>

The rubber composition obtained in the first step, 0.75 part by weight of the vulcanization accelerator, N-tert-butyl-2-benzothiazolylsulfenamide (BBS) and 1.5 parts by weight of sulfur are blended to conduct kneading in an open roll at a temperature of 60 to 80° C. to obtain a kneaded product.

<Third Step>

The kneaded product obtained in the second step is vulcanized at 145° C. to obtain a vulcanized rubber.

Example 48

A vulcanized rubber obtained in the following first step to third step is suitable for carcass.

<First Step>

Seventy (70) parts by weight of natural rubber ("TSR20"), parts of styrene-butadiene copolymer rubber SBR #1502 (manufactured by Sumitomo Chemical Co., Ltd.), 60 parts by weight of N339 manufactured by Mitsubishi Chemical Co., Ltd., 2 parts by weight of stearic acid, 5 parts by weight of zinc oxide, 7 parts of process oil (Diana Process PS32 manufactured by Idemitsu Kosan Co. and 1 part of sodium salt of S-(3-aminopropyl)thiosulfuric acid are blended to conduct kneading with a Banbury mixer (600 ml Laboplastomill manufactured by Toyo Seiki Seisakusho) to obtain a rubber composition. The step is carried out by conducting kneading at 50 rpm of the rotating speed of the mixer for 5 minutes after adding of each of agents and filler, and the rubber temperature at that time is 160 to 175° C.

<Second Step>

The rubber composition obtained in the first step, 1 part by weight of the vulcanization accelerator, N-tert-butyl-2-benzothiazolylsulfenamide (BBS), 3 parts by weight of sulfur, 1 parts of the age resister (N-phenyl-N'-1,3-dimethylbutyl-p-phenylenediamine: commodity name "ANTIGENE (registered trade mark) 6C" manufactured by Sumitomo Chemical Co., Ltd.) and 1 part by weight of the vulcanization accelerator (condensation product of aniline and acetone (TMDQ)) are blended to conduct kneading in an open roll at a temperature of 60 to 80° C. to obtain a kneaded product.

<Third Step>

The kneaded product obtained in the second step is vulcanized at 145° C. to obtain a vulcanized rubber.

Example 49

A vulcanized rubber obtained in the following first step to third step is suitable for captread.

<First Step>

On hundred (100) parts by weight of styrene-butadiene copolymer rubber SBR #1500 (manufactured by JSR), 78.4 parts by weight of silica (commodity name: "Ultrasil (registered trade mark) VN3-G" manufactured by Degussa), 6.4 parts by weight of carbon black (commodity name: "N-339"

manufactured by Mitsubishi Chemical Co., Ltd.), 6.4 parts by weight of the silane coupling agent (bis(3-triethoxysilylpropyl)tetrasulfide: commodity name: "Si-69" manufactured by Degussa), 47.6 parts by weight of process oil (commodity name: "NC-140" manufactured by Cosmo Oil Co., Ltd.), 1.5 parts of the age resister (N-phenyl-N'-1,3-dimethylbutyl-p-phenylenediamine: commodity name "ANTIGENS (registered trade mark) 6C" manufactured by Sumitomo Chemical Co., Ltd.), 2 parts by weight of zinc oxide, 2 parts by weight of stearic acid and 3 parts of sodium salt of S-(3-aminopropyl) thiosulfuric acid are blended to conduct kneading with a Banbury mixer (600 ml Laboplastomill manufactured by Toyo Seiki Seisakusho) to obtain a rubber composition. The step is operated in a temperature range of 70° C. to 120° C., and carried out by conducting kneading at 80 rpm of the rotating speed of the mixer for 5 minutes after adding of each of agents and filler, followed by conducting kneading at 100 rpm of the rotating speed of the mixer for 5 minutes.

<Second Step>

The rubber composition obtained in the first step, 1 part by weight of the vulcanization accelerator (N-cyclohexyl-2-benzothiazolylsulfenamide (CBS)), 1 part by weight of the vulcanization accelerator (diphenylguanidine (DPG)), 1.5 parts of wax ("SANNOC (register trade mark) N" manufactured by OUCHI SHINKO CHEMICAL INDUSTRIAL) and 1.4 parts by weight of sulfur are blended to conduct kneading in an open roll at a temperature of 60 to 80° C. to obtain a kneaded product.

<Third Step>

The kneaded product obtained in the second step is vulcanized at 160° C. to obtain a vulcanized rubber.

Example 50

A vulcanized rubber is obtained according to the same manner as that in Example 49 except that solution polymerization SBR ("Asaprene (registered trade mark)" manufactured by Asahi Chemicals) is used in place of styrene-butadiene copolymer rubber SBR #1500 (manufactured by JSR). This vulcanized rubber is suitable for captread.

Example 51

A vulcanized rubber is obtained according to the same manner as that in Example 49 except that SBR#1712 (manufactured by JSR) is used in place of styrene-butadiene copolymer rubber SBR #1500 (manufactured by JSR), and the used amount of process oil is set to 21 parts by weight. This vulcanized rubber is suitable for captread.

INDUSTRIAL APPLICABILITY

According to the present invention, method for improving the viscoelastic properties of a vulcanized rubber used for production of tires can be provided.

The invention claimed is:

1. A method for improving the viscoelastic properties of a vulcanized rubber, comprising the steps of blending rubber with S-(3-aminopropyl)thiosulfuric acid and/or a metal salt thereof, kneading the blend of rubber and S-(3-aminopropyl)thiosulfuric acid and/or a metal salt thereof at 160° C. to 200° C., blending a sulfur component, kneading the blend of rubber, S-(3-aminopropyl)thiosulfuric acid and/or a metal salt thereof and the sulfur component, and vulcanizing the kneaded blend of rubber, S-(3-aminopropyl)thiosulfuric acid and/or a metal salt thereof, and the sulfur component.

2. The method according to claim 1, wherein the rubber is blended with a metal salt of the S-(3-aminopropyl)thiosulfuric acid.

3. The method according to claim 2, wherein a metal ion of the metal salt of the S-(3-aminopropyl)thiosulfuric acid is a lithium ion, a sodium ion, a potassium ion, a cesium ion, a cobalt ion, a copper ion or a zinc ion.

4. The method according to claim 3, wherein the metal ion is a lithium ion, a sodium ion or a potassium ion.

5. The method according to claim 2, wherein the metal salt of S-(3-aminopropyl)thiosulfuric acid is a 3-aminopropylthiosulfate represented by formula (2)

$(H_2N-(CH_2)_3-SSO_3^-)_n \cdot M^{n+}$ (2)

wherein $M^{n+}$ represents a metal ion and n represents a valence thereof.

6. The method according to claim 5, wherein the metal ion is a lithium ion, a sodium ion, a potassium ion, a cesium ion, a cobalt ion, a copper ion or a zinc ion.

7. The method according to claim 6, wherein the metal ion is a lithium ion, a sodium ion or a potassium ion.

8. The method according to claim 1, wherein the rubber and S-(3-aminopropyl)thiosulfuric acid and/or a metal salt thereof are blended with fillers prior to kneading.

9. The method according to claim 1, wherein the rubber and S-(3-aminopropyl)thiosulfuric acid and/or a metal salt thereof are blended with zinc oxide prior to kneading.

10. The method according to claim 1, wherein the kneaded rubber and S-(3-aminopropyl)thiosulfuric acid and/or a metal salt thereof are blended with a vulcanization accelerator prior to vulcanization.

* * * * *